(12) United States Patent
Ghurmallah et al.

(10) Patent No.: US 9,850,361 B2
(45) Date of Patent: Dec. 26, 2017

(54) WATER EXPANDABLE POLYMER BEADS CONTAINING LATEX PARTICLES

(71) Applicant: SABIC GLOBAL TECHNOLOGIES B.V., Bergen Op Zoom (NL)

(72) Inventors: Ghamdi Ghurmallah, Riyadh (SA); Timotheus Johannes Jacobus Sciarone, Eindhoven (NL); Thierry Leblanc, Cedex (FR); Tom Bus, Eindhoven (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 0 days.

(21) Appl. No.: 15/531,925

(22) PCT Filed: Nov. 30, 2015

(86) PCT No.: PCT/EP2015/078052
§ 371 (c)(1),
(2) Date: May 31, 2017

(87) PCT Pub. No.: WO2016/087364
PCT Pub. Date: Jun. 9, 2016

(65) Prior Publication Data
US 2017/0313842 A1 Nov. 2, 2017

(30) Foreign Application Priority Data
Dec. 2, 2014 (EP) .................................. 14195830

(51) Int. Cl.
*C08J 9/12* (2006.01)
*C08J 9/20* (2006.01)

(52) U.S. Cl.
CPC ............. *C08J 9/20* (2013.01); *C08J 2203/10* (2013.01); *C08J 2313/02* (2013.01); *C08J 2319/02* (2013.01)

(58) Field of Classification Search
CPC ......... C08F 12/08; C08F 12/30; C08J 9/0061; C08J 9/0071; C08J 9/125; C08J 9/20; C08J 2203/10; C08J 2205/04; C08J 2325/06; C08J 2325/08; C08J 2471/12
See application file for complete search history.

(56) References Cited

U.S. PATENT DOCUMENTS

| 5,096,931 A | 3/1992 | Wittenberg et al. |
| 6,242,540 B1 | 6/2001 | Crevecoeur et al. |
| 2007/0179205 A1* | 8/2007 | Loh .................. C08J 9/0066 521/56 |

FOREIGN PATENT DOCUMENTS

| WO | 9801489 | 1/1998 |
| WO | 9801501 | 1/1998 |
| WO | 2007030719 A2 | 3/2007 |
| WO | 2013029757 A1 | 3/2013 |
| WO | 2013034276 A1 | 3/2013 |

OTHER PUBLICATIONS

Crevecoeur, J. "Water Expandable Polystyrene," Eindhoven University of Technology; 1997, pp. 1-147.
International Search Report and Written Opinion for PCT/EP2015/078052, dated Dec. 23, 2015, 12 pages.
Shen, Jiong, "Synthesis and foaming of water expandalbe polystyrene-clay nanocomposites", Polymer 47 (2006) 6303-6310.

* cited by examiner

*Primary Examiner* — Irina S Zemel
(74) *Attorney, Agent, or Firm* — Cantor Colburn LLP

(57) ABSTRACT

An emulsifier-free process for the preparation of water expandable polymer beads, including: a) providing an emulsifier-free starting composition comprising styrene, b) prepolymerizing the starting composition to obtain a prepolymer composition, c) mixing an aqueous blowing agent with the prepolymer composition at an elevated temperature to obtain an inverse emulsion of water droplets in the prepolymer composition, wherein the aqueous blowing agent comprises water and a water soluble initiator dissolved in the water and the water droplets comprise spheres of a styrene polymer, wherein the water soluble initiator partly decomposes due to the elevated temperature leading to the formation of the inverse emulsion of water droplets in the prepolymer composition, d) suspending the inverse emulsion in an aqueous medium to yield an aqueous suspension of suspended droplets and e) polymerizing monomers in the droplets of the suspension obtained by step d) to obtain the water expandable polymer beads.

20 Claims, 5 Drawing Sheets

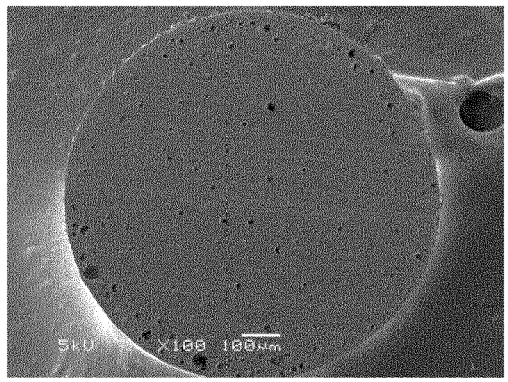 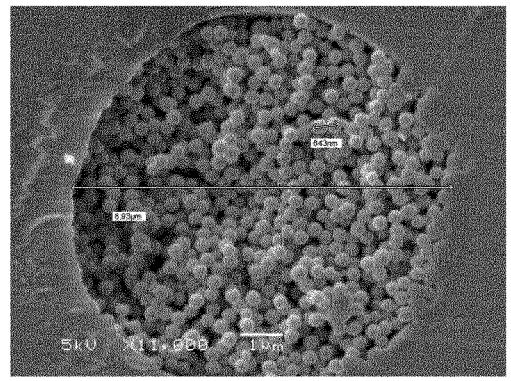
a  Figure 1  b
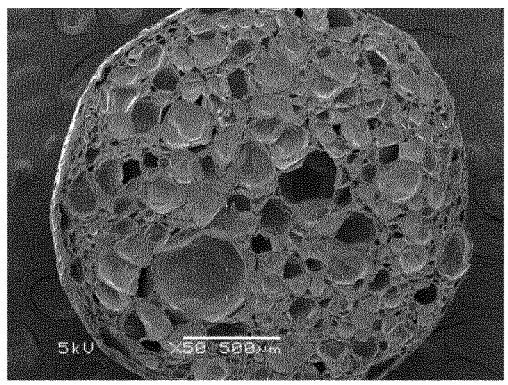
Figure 2
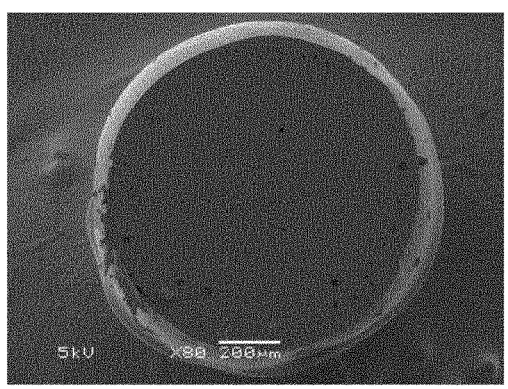 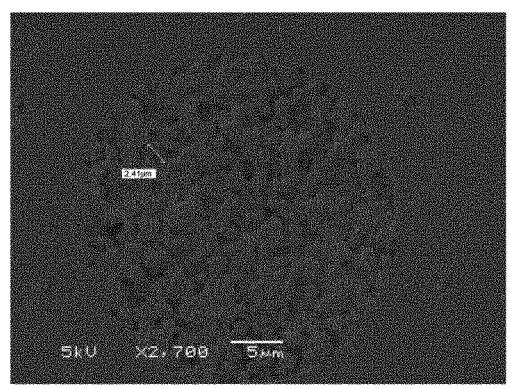
a  Figure 3  b

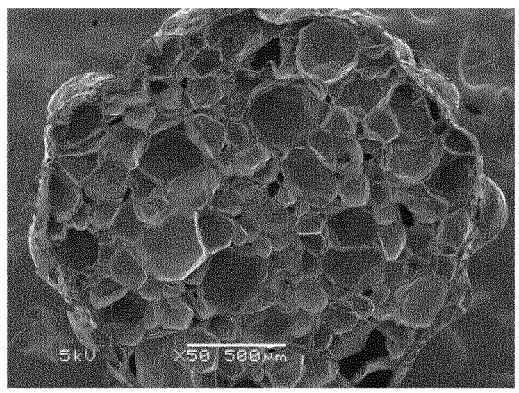
Figure 4
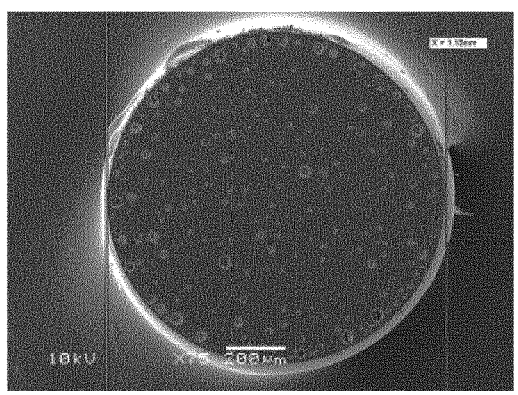 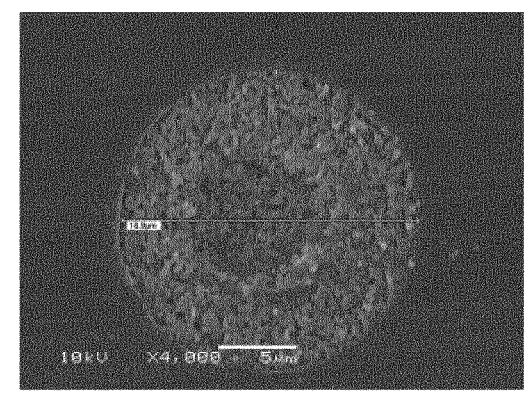
a          Figure 5          b
Figure 6

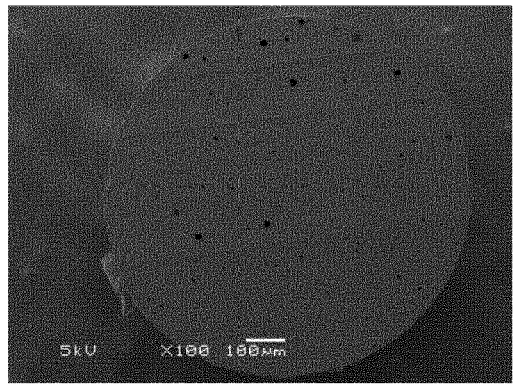
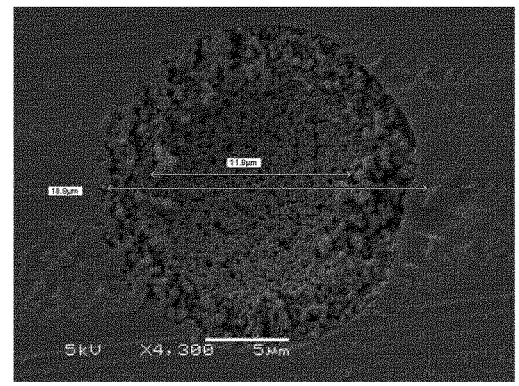
a     Figure 7     b
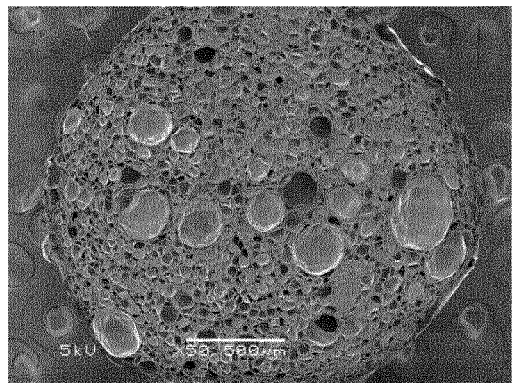
Figure 8
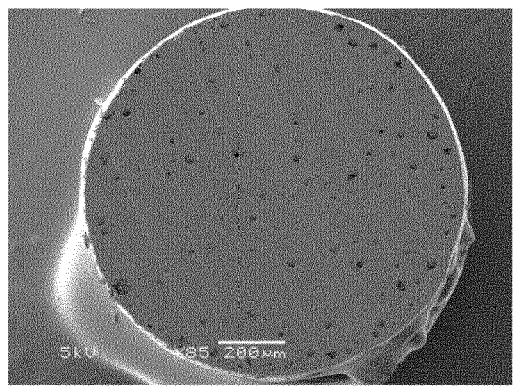
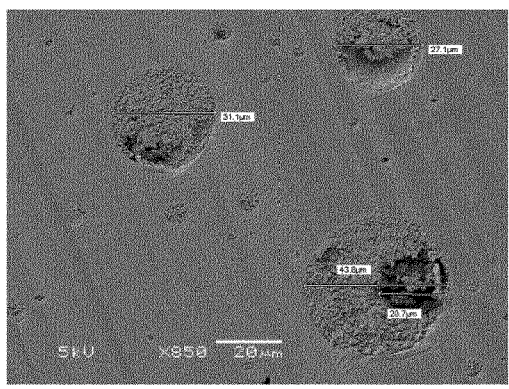
a     Figure 9     b

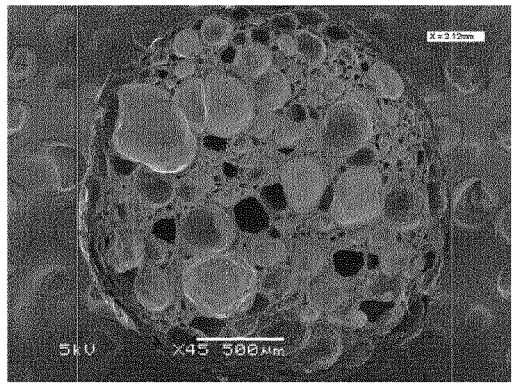
Figure 10
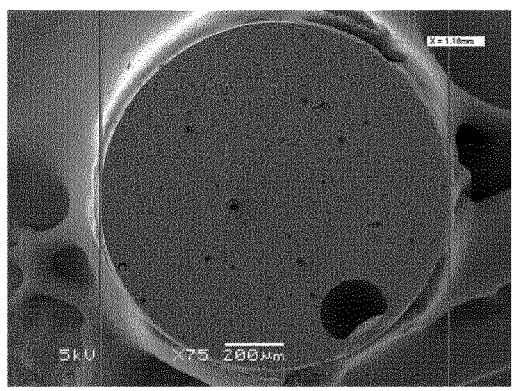
a
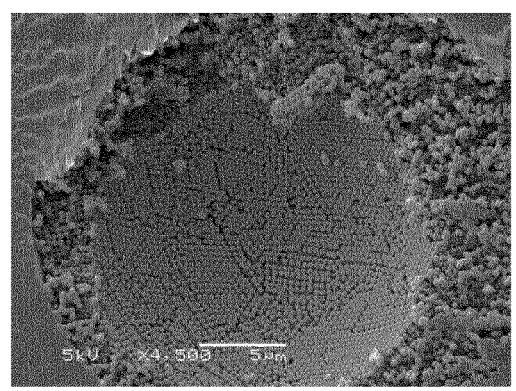
b
Figure 11
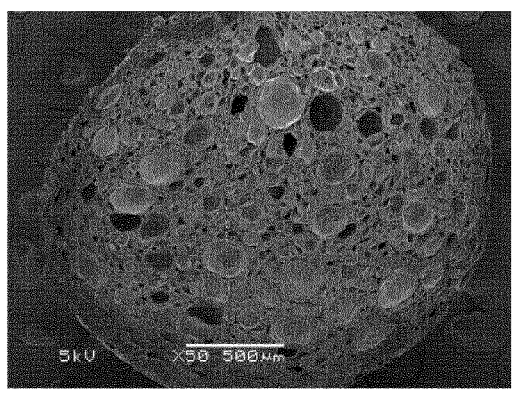
Figure 12

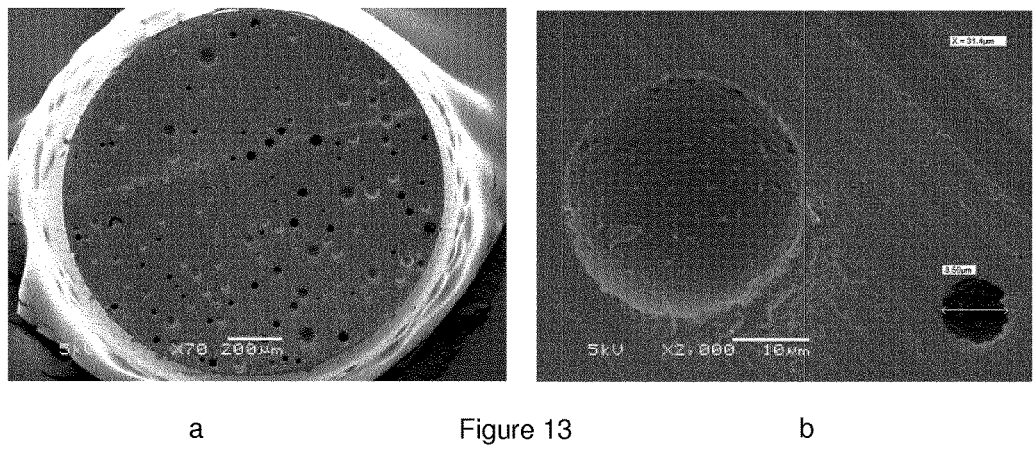
a     Figure 13     b
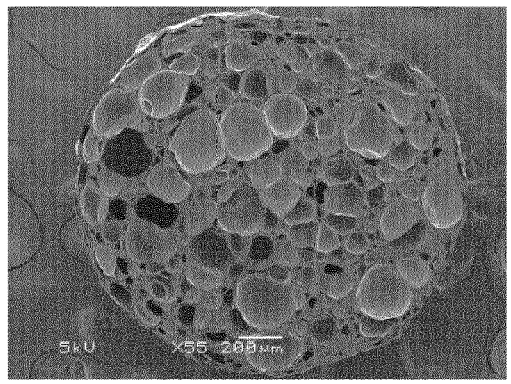
Figure 14

WATER EXPANDABLE POLYMER BEADS CONTAINING LATEX PARTICLES

This application is a national stage application of PCT/EP2015/078052, filed Nov. 30, 2015, which claims priority to European Patent Application 14195830.6 filed Dec. 2, 2014, both of which are hereby incorporated by reference in their entirety.

The present invention relates to a process for the preparation of water expandable polymer beads (WEPS). The present invention further relates to such WEPS and expanded polymer beads obtained by expanding such WEPS.

Commercially available expandable polystyrene beads (EPS) generally use pentane isomers as the blowing agent. The application of pentane and its isomers results in homogeneous EPS foams of low density. However, one main disadvantage of using pentane or its isomers is the harmfulness to the environment. Research showed that both pentane and its isomers contribute to ozone formation in the lower atmosphere. Also carbon dioxide, which contributes to the greenhouse effect, is being formed during the photo-oxidation of pentane.

A dissertation of the University of Eindhoven "Water Expandable Polystyrene" by J. J. Crevecoeur dating from 1997 describes a process for the production of WEPS, in which water, finely distributed in styrene, is first of all emulsified by means of surface-active substances, after which the styrene is polymerized up to a conversion of 50%, the mixture is suspended in water with phase inversion and the styrene is finally polymerized to completion by means of peroxide initiators. The surface-active substances used are amphiphilic emulsifiers, e.g. sodium bis(2-ethylhexyl)sulfosuccinate (AOT) or block copolymers of sodium styrenesulfonate (SSS) and styrene which were prepared in-situ using a phase transfer catalyst as described in U.S. Pat. No. 6,242,540. All of these substances exhibit both a hydrophilic and a hydrophobic moiety and are thus capable of emulsifying water in styrene.

WO98/01489 describes the preparation of beads consisting of polystyrene homopolymer. An additional emulsifier (preferably sodium bis(2-ethylhexyl)sulfosuccinate: AOT) is used in the prepolymerization step to emulsify the water droplets in the polystyrene/styrene prepolymer mixture. The problem of using emulsifiers with long linear alkyl chains is that the miscibility of these aliphatic emulsifier tails with the aromatic styrene/polystyrene phase decreases with increasing conversion of the styrene/polystyrene mixture. At a certain degree of conversion showing a certain high viscosity, destabilization of the inverse emulsion can take place which results in coalescence of dispersed water droplets.

U.S. Pat. No. 5,096,931 describes the use of water-absorbent organic polymers (such as cross-linked polyacrylic acid or polymethacrylic acid) as a means to introduce water into a polystyrene matrix. In U.S. Pat. No. 5,096,931, water is used as a co-blowing agent, in addition to the traditional organic hydrocarbon blowing agents. The use of water absorbing polar polymers in WEPS, where water is the only blowing agent, is described in WO98/01501.

Polymer, 2006, 47, 6303-6310 and WO2007/030719 describe a method similar to the method developed by Crevecoeur et al. to prepare WEPS beads. However, sodium montmorillonite nanoclay ($Na^+MMT$) was added to the emulsified water as a water absorber/carrier. For these reactions, an emulsifier sodium bis(2-ethylhexyl) sulfosuccinate (AOT) was used as emulsifier. An improved water uptake and reduced water loss during storage due to the presence of montmorillonite nanoclay is described. WEPS foams with a density of less than 50 $kg/m^3$ were obtained. According to these publications, the montmorillonite nanoclay forms a layer around the cell wall during foaming of the WEPS beads. This layer reduces free diffusion of water out of the bead during the foaming procedure so that more water is available for expansion and hence larger expansion ratios are obtained. Furthermore, it was found that the presence of nanoclay reduces the loss of water during storage.

WO2013/029757 discloses the preparation of WEPS comprising a copolymer of styrene and a polar comonomer instead of polystyrene homopolymer. Further this publication discloses the use of nanoclay as water absorber/carrier in an emulsifier-free process. The presence of the copolymer of styrene and the polar comonomer and the nanoclay results in stable suspensions and final beads showing a high water uptake and a homogeneous distribution of the nanoclay/water dispersion in the polymer matrix. The copolymerization of significant amounts of polar comonomers with styrene may however lead in certain cases to beads with rather broad glass transition temperatures $T_g$. Such broad $T_g$s are usually associated with inhomogeneous expansion during foaming of such beads.

WO2013/034276 discloses a process for the emulsifier-free preparation of water expandable polymer beads. In this process, an emulsifier-free starting composition comprising styrene and a polyphenylene ether (PPE) resin is prepolymerized and an aqueous dispersion of a modifier-free nanoclay was added to the prepolymer composition to obtain an inverse emulsion. After suspending droplets of the inverse emulsion in an aqueous medium, the monomers in the droplets are polymerized. A very stable suspension polymerization system was obtained which results in polymer beads having a good expandability.

There is a need in the industry for a novel process for the preparation of water expandable polymer beads.

It is an object of the present invention to provide a novel process for the preparation of water expandable polymer beads in which the above and/or other problems are reduced.

According to the present invention, there is provided a process for the preparation of water expandable polymer beads, which process comprises the steps of:
  a) providing an emulsifier-free starting composition comprising styrene,
  b) prepolymerizing the starting composition to obtain a prepolymer composition,
  c) mixing an aqueous blowing agent with the prepolymer composition at an elevated temperature to obtain an inverse emulsion of water droplets in the prepolymer composition, wherein the aqueous blowing agent comprises water and a water soluble initiator dissolved in the water and the water droplets comprise spheres of a styrene polymer,
  d) suspending the inverse emulsion in an aqueous medium to yield an aqueous suspension of suspended droplets and
  e) polymerizing monomers in the droplets of the suspension obtained by step d) to obtain the water expandable polymer beads.

According to the present invention, there is provided an emulsifier-free process for the preparation of water expandable polymer beads, which process comprises the steps of:
  a) providing an emulsifier-free starting composition comprising styrene,
  b) prepolymerizing the starting composition to obtain a prepolymer composition,
  c) mixing an aqueous blowing agent with the prepolymer composition at an elevated temperature to obtain an inverse emulsion of water droplets in the prepolymer composition, wherein the aqueous blowing agent comprises water and a water soluble initiator dissolved in the water and the water droplets comprise spheres of a styrene polymer, wherein the water soluble initiator partly decomposes due to the elevated temperature leading to the formation of the inverse emulsion of water droplets in the prepolymer composition, d) suspending the inverse emulsion in an aqueous medium to yield an aqueous suspension of suspended droplets and e) polymerizing monomers in the droplets of the suspension obtained by step d) to obtain the water expandable polymer beads.

The process according to the present invention results in WEPS beads in which the water droplets contain very small polymeric spheres, unlike known WEPS beads in which the droplets consists only of water.

According to the invention, an aqueous blowing agent is mixed with the prepolymer composition to obtain an inverse emulsion of water droplets in the prepolymer composition. The water droplets comprise dissolved initiator. As a result of the elevated temperature during the mixing, the initiator will partly decompose. It was found that this leads to emulsion polymerization within the water droplets. The emulsion polymerization will result in the formation of small (typically 300-500 nm) polymeric spheres that can partially or almost completely fill the water droplets.

According to the invention, a good distribution of water droplets in the WEPS beads was obtained resulting in good expandability of the WEPS beads. A more homogeneous distribution of water droplets results in more homogeneous expansion of the WEPS bead. The ideal distribution of the water blowing agent is obtained when the droplet diameter is minimal and these droplets are evenly distributed throughout the volume of the WEPS bead. Such a distribution approaches the situation in pentane-loaded EPS, where the pentane blowing agent is homogeneously dissolved in the polymer matrix.

The minimal droplet size is limited by the shear forces that can be exerted by the stirrer during pre-polymerization. The present inventors realized that the water constituting the droplet can be further subdivided by introducing polymeric spheres in the water droplets. The polymeric spheres thus effect further reduction of the effective droplet diameter by compartmentalization of the water droplets. This results in a more homogeneous expansion of the WEPS bead.

Expansion is the result of water vapor generated by heating the beads above the boiling point of water and above the softening temperature of the polymer matrix. The phase transition from liquid water to steam takes place on irregularities on the surface which act as nucleation sites for bubble growth. Although not wishing to be bound by any theory, it is believed that the superior expansion properties of beads prepared by the present invention arise from the enhanced nucleation properties owing to the presence of the polymeric particles within the water droplets.

The water expandable polymer beads obtained according to the invention have good water droplet distribution throughout beads and reduced foam collapse. Improved pre-expansion was observed, as well as a decreased density and a smoother surface of the expanded polymer beads.

The process according to the present invention is an emulsifier-free process. As mentioned earlier, the addition of an emulsifier leads to undesirable situations such as a complete inverse emulsion.

Known emulsifiers used for the preparation of water-expandable polymer beads in the prior art are sorbitan carboxylates, sorbitol or mannitol carboxylates, glycol or glycerol carboxylates, alkanolamides, alkyl phenols and dialkyl ethers (any of which emulsifiers may or may not contain a polyalkoxy chain with 1 to 20 oxyalkylene groups). Other known emulsifiers used for the preparation of water-expandable polymer beads are salts of long chain (C8-C30) carboxylic acids, long chain (C8-30) alkyl sulphonic acid, Other known emulsifiers used for the preparation of water-expandable polymer beads are alkylarylsulphonic acid, sulphosuccinic acid, high-molecular-weight fatty amines, ammonium or other nitrogen derivatives of long chain carboxylic acids.

The term "emulsifier-free process" is herein meant a process in which the starting composition includes no or little amount, e.g. less than 0.01 wt % (with respect to the monomers in the starting composition), of the emulsifiers mentioned in the preceding paragraph.

Step a)

The starting composition used in the process of the present invention is provided in step a). The starting composition comprises styrene. The starting composition may further comprise a polymerization initiator. It is noted that a combination of more than one initiators may also be used.

The polymerization initiator which may be included in the starting composition can be selected from the conventional initiators for free-radical styrene polymerization. They include in particular organic peroxy compounds, such as peroxides, peroxycarbonates and peresters. Combinations of peroxy compounds can also be used. Typical examples of the suitable peroxy initiators are C6-C20 acyl peroxides such as decanoyl peroxide, dibenzoyl peroxide, octanoyl peroxide, stearyl peroxide, 3,5,5-trimethyl hexanoyl peroxide, peresters of C2-C18 acids and C1-C5 alkyl groups, such as t-butylperbenzoate, t-butylperacetate, t-butyl-perpivalate, t-butylperisobutyrate and t-butyl-peroxylaurate, and hydroperoxides and dihydrocarbyl (C3-C10) peroxides, such as diisopropylbenzene hydroperoxide, di-t-butyl peroxide, dicumyl peroxide or combinations thereof. Most suitable initiators include dibenzoyl peroxide and tert-butylperoxybenzoate.

Radical initiators different from peroxy compounds are not excluded. A suitable example of such a compound is α,α'-azobisisobutyronitrile.

The amount of the polymerization initiator in the starting composition is suitably from 0.01 to 1 wt %, based on the weight of the monomers in the starting composition.

In some embodiments, the starting composition further comprises a polyphenylene ether (PPE) resin. Examples of the PPE resin are mentioned in WO2013/034276. It was found that this results in a smaller size of the holes in the WEPS and lower density of the expanded WEPS. The PPE resin is normally a homo- or copolymer having units of the formula

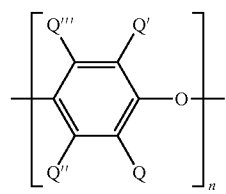

wherein Q, Q', Q", Q''' are independently selected from the group consisting of hydrogen, halogen, hydrocarbon, halohydrocarbon, hydrocarbonoxy and halohydrocarbonoxy; and n represents the total number of monomer units and is an integer of at least about 20, and more usually at least 50.

The polyphenylene ether resin can be prepared in accordance with known procedures, such as those described in Hay, U.S. Pat. Nos. 3,306,874 and 3,306,875; and Stamatoff, U.S. Pat. Nos. 3,257,357 and 3,257,358; from the reaction of phenols including but not limited to 2,6-dimethylphenol; 2,6-diethylphenol; 2,6-dibutylphenol; 2,6-dilaurylphenol; 2,6-dipropylphenol; 2,6-diphenylphenol; 2-methyl-6-tolyl-phenol; 2-methyl-6-methoxyphenol; 2,3,6-trimethylphenol; 2,3,5,6-tetramethylphenol; and 2,6-diethyoxyphenol.

Each of these may be reacted alone to produce the corresponding homopolymer, or in pairs or with still other phenols to produce the corresponding copolymer. Examples of the homopolymer include poly(2,6-dimethyl-1,4-phenylene)ether, poly(2,6-diethyl-1,4-phenylene)ether, poly(2,6-dibutyl-1,4-phenylene)ether, poly(2,6-dilauryl-1,4-phenylene)ether, poly(2,6-dipropyl-1,4-phenylene)ether, poly(2,6-diphenyl-1,4-phenylene)ether, poly(2-methyl-6-methoxy-1,4-phenylene)ether, poly(2-methyl-6-butyl-1,4-phenylene)ether, poly(2,6-dimethoxy-1,4-phenylene)ether, poly(2,3,6-trimethyl-1,4-phenylene)ether, poly(2,3,5,6-tetramethyl-1,4-phenylene)ether, and poly(2,6-diethyoxy-1,4-phenylene)ether. Examples of the copolymer include, especially those of 2,6-dimethylphenol with other phenols, poly(2,6-dimethyl-co-2,3,6-trimethyl-1,4-phenylene)ether and poly(2,6-methyl-co-2-methyl-6-butyl-1,4-phenylene)ether.

For the purposes of the present invention, an especially preferred family of polyphenylene ethers includes those having alkyl substitution in the two positions ortho to the oxygen ether atom, i.e. those of the above formula wherein Q and Q' are alkyl, most preferably having 1 to 4 carbon atoms. Illustrative members of this class are: poly(2,6-dimethyl-1,4-phenylene)ether; poly(2,6-diethyl-1,4-phenylene)ether; poly(2-methyl-6-ethyl-1,4-phenylene)ether; poly(2-methyl-6-propyl-1,4-phenylene)ether; poly(2,6-dipropyl-1,4-phenylene)ether; poly(2-ethyl-6-propyl-1,4-phenylene) ether; and the like.

The most preferred polyphenylene ether resin for purposes of the present invention is poly(2,6-dimethyl-1,4-phenylene)ether.

The weight ratio of styrene and the PPE resin in the starting composition is preferably between 99:1 to 70:30, more preferably 99:1 to 80:20, even more preferably 95:5 to 85:15.

In some embodiments, the starting composition in the process according to the present invention comprises no or little amount, e.g. less than 0.01 wt % (with respect to the monomers in the starting composition) of a polyphenylene ether resin. This is preferable in view of the ease of recycle of WEPS beads.

In some embodiments, the starting composition may further comprise a comonomer copolymerisable with styrene. The comonomer can for example be a polar comonomer containing a carbon-to-carbon double bond as described in WO2013/034276. The comonomers in the starting composition may be the same as the comonomers in the blowing agent described below. The copolymer results in stable suspensions and final beads showing a high water uptake and a homogeneous distribution of the water dispersion in the polymer matrix.

The amount of the polar comonomer with respect to styrene in the starting composition influences the water droplet distribution, as well as the degree of the emulsification of water in the prepolymer composition. The weight ratio of styrene and the polar comonomer in the starting composition may e.g. be 99:1 to 70:30.

For some polar comonomers however, the incorporation of the polar comonomer can result in a distribution of $T_g$ values in the final copolymer. This effect can lead to a less homogeneous foaming process. This is also disadvantageous in view of the ease of recycle of WEPS beads. Accordingly, in some embodiments, the starting composition in the process according to the invention comprises no or little amount, e.g. less than 0.01 wt % (with respect to the monomers in the starting composition) of a comonomer copolymerisable with styrene. It is an advantage of the present invention that the advantage of the copolymer can be achieved by the copolymer within the water droplets instead of the copolymer used for the matrix of the WEPS beads.

The starting composition may further comprise polystyrene. The weight ratio of polystyrene in the starting composition is preferably between 1-20 wt %, more preferably 5-15 wt % of the total weight of the monomers in the starting composition. Any polystyrene may be used, including a non-recycled polystyrene homopolymer, a recycled polystyrene, polystyrene produced as a waste during the production of expandable polystyrene beads. Use of polystyrene produced as a waste during the production of expandable polystyrene beads is especially advantageous in that the waste can be used.

The starting composition may further contain other additives in effective amounts. Such additives include chain transfer agents, dyes, fillers, flame retarding compounds, nucleating agents, antistatic compounds and lubricants.

In particularly advantageous embodiments, the starting composition comprises styrene, an initiator, a polyphenylene ether resin and no or little amount of a comonomer copolymerisable with styrene.

Step b)

The starting composition is subjected to a prepolymerization step to obtain a mixture of the components of the starting composition and a polymer polymerized from the monomers in the starting composition. The starting composition may be added to a reactor, e.g. a double-walled reactor equipped with motorized stirrer, reflux cooler, temperature sensor and nitrogen inlet.

The reactor may be purged with a nitrogen flow of e.g. 0.5 L/min during the whole reaction. The stirring speed is set to an appropriate speed, e.g. at 300 rpm.

The starting composition is heated to the reaction temperature to obtain a prepolymer composition. The reaction temperature is typically chosen to be in the range of 80 to 91° C. More preferably, the reaction temperature is chosen to be in the range of 85 to 91° C., even more preferably 89 to 91° C. In the cases where azo type initiators are used, the reaction temperature may be chosen to be lower than 80° C., e.g. 70-80° C. The reaction temperature is chosen to control the reaction rate to an appropriate level. When the temperature is too low, the reaction the overall reaction rate is too low. Similarly, when the temperature is too high, the overall reaction rate becomes too high.

When the temperature reaches the reaction temperature, the reaction mixture is subsequently held at the reaction temperature for 30-120 minutes. Preferably, the reaction time is 45-90 minutes, more preferably 70-90 minutes.

Particularly preferred is heating at a temperature of 85-91° C. for 70-90 minutes, more preferably from 70-80 min.

The degree of conversion of the prepolymer composition to be mixed with the aqueous blowing agent in step c) is preferably 20 to 55%, more preferably 20 to 35%, based on the monomers. The degree of conversion can be determined by evaporating the volatile monomers from a sample of the reaction mixture of a known weight and measuring the residual weight of the non-volatile polymer. The weight of the polymer made from the added monomers can be determined taking into account the initially weighed amount of any polymer already added in the starting composition. The sample may be dried e.g. at 60° C. for at least 24 hours under vacuum to remove the volatile monomer fraction.

Step c)

The prepolymer composition obtained according to step b) is mixed with an aqueous blowing agent comprising water and a water soluble initiator dissolved in the water. Typically, the aqueous blowing agent is added to the prepolymer composition. The addition is done after some portion of the monomers have been converted to copolymer, as described above. Without wishing to be bound by any theory, it is thought that the viscosity of the prepolymer composition has to be sufficiently high prior to addition of the aqueous blowing agent. Water droplet coagulation and inhomogeneous droplet distribution may occur when the aqueous blowing agent is added to a low viscous reaction mixture.

The water soluble initiator is an initiator that can start polymerization of styrene within the water droplets, or copolymerization of styrene and a comonomer as described above if present. The water soluble initiator is preferably a persulfate. Suitable examples include sodium peroxomonosulfate ($Na_2SO_5$), potassium peroxymonosulfate ($KHSO_5$), potassium persulfate ($K_2S_2O_8$), sodium persulfate (sodium peroxydisulfate) ($Na_2S_2O_8$) and ammonium persulfate (ammonium peroxydisulfate) (($NH_4)_2S_2O_8$). Preferably, the water soluble initiator is selected from potassium persulfate ($K_2S_2O_8$) and ammonium persulfate (($NH_4)_2S_2O_8$). It is possible to use either individual initiators or mixtures of various initiators.

The water soluble initiator may also be selected from the family of azo compounds carrying polar functionalities. Examples include the azo compounds commercially available from Wako Pure Chemical Industries Ltd, such as 2,2'-Azobis[2-(2-imidazolin-2-yl)propane]dihydrochloride (trade name VA-044), 2,2'-Azobis[2-(2-imidazolin-2-yl)propane]disulfate dihydrate (VA-046B), 2,2'-Azobis(2-methylpropionamidine)dihydrochloride (V50), 2,2'-Azobis{2-methyl-N-[1,1-bis(hydroxymethyl)-2-hydroxyethl]propionamide} (VA-080), 2,2'-Azobis[2-methyl-N-(2-hydroxyethyl)propionamide] (VA-086).

The amount of the water soluble initiator is preferably between 0.001 and 1 wt %, preferably between 0.005 and 0.1 wt %, more preferably between 0.01 and 0.05 wt %, based on the weight of the monomers in the starting composition.

The aqueous blowing agent is mixed with the prepolymer composition by stirring at an elevated temperature, preferably the temperature is 70-150° C., more preferably 80-140° C., most preferably 85-135° C. Particularly preferably, step c) involves stirring the mixture at a temperature of 85-95° C.

Step c) results in an inverse emulsion of water in the prepolymer composition, i.e. droplets of water comprising polymeric spheres are dispersed in the prepolymer composition. As a result of the elevated temperature during mixing in step c), the initiator will partly decompose. The initiator is water soluble, thus present in the water droplets. It was found that the decomposition of the initiator leads to emulsion polymerization within the water droplets dispersed in the prepolymer composition. The emulsion polymerization will result in the formation of small (typically 300-500 nm) polymeric spheres that can partially or almost completely fill the water droplets.

The inverse emulsion is kept isothermally for some time, e.g. 10-40 min at or close to the reaction temperature, e.g. at 90° C.

In some embodiments, the aqueous blowing agent consists of water and a water soluble initiator dissolved in the water.

In other embodiments, the aqueous blowing agent further comprises a modifier-free nanoclay dispersed in the water. In this case, the aqueous blowing agent is a dispersion of a modifier-free nanoclay dispersed in an aqueous solution of the water-soluble initiator. It was found that this results in a higher water uptake in the WEPS beads and a lower density of the expanded WEPS beads. The aqueous blowing agent comprising a modifier-free nanoclay can be prepared in any order. One way is dissolving the water soluble initiator in the water and mixing an aqueous dispersion of modifier-free nanoclay with the water solution of the water soluble initiator. Another way is adding the water soluble initiator and nanoclay in water and stirring to dissolve the initiator and disperse the nanoclay.

The nanoclay used in the present invention is a modifier-free nanoclay. Modifier-free nanoclays used in the present invention are not particularly limited and include modifier-free nanoclays such as sodium montmorillonite ($Na^+MMT$), and calcium montmorillonite ($Ca^{2+}MMT$), which can be synthetic or natural. Although calcium montmorillonite typically exists as aggregates formed of layered structures, the aggregates can be exfoliated in a water-based solution. It is to be appreciated that layered talc minerals may be included in addition to, or in place of, the modifier-free nanoclays, and such embodiments are considered to be within the purview of this invention. In preferred embodiments, the nanoclay is a sodium montmorillonite ($Na^+MMT$) nanoclay. It is commercially available from e.g. Southern Clay Products, Inc or Nanocor. The sodium montmorillonite available from Aldrich is sold under the name Nanocor PGV. Nanocor PGV has an aspect ratio of 150-200 and a maximum moisture uptake of 18 wt %. The sodium montmorillonite available from Southern Clay Products is sold under the name Nanofil116 and has a moisture content of 11 wt %.

The amount of the nanoclay is preferably 0.1-10 wt % with respect to the total weight of the monomers in the starting composition, more preferably 0.1-5 wt %, more preferably 0.1-1.0 wt %, more preferably 0.3-1.0 wt %. Even more preferably, the amount of the nanoclay is 0.5-1.0 wt %. This range of nanoclay results in a particularly improved water uptake.

The aqueous dispersion of the nanoclay may be obtained by a combination of high shear mixing and ultrasonification. For example, the water containing the nanoclay is subjected to a high shear mixing of 15000-20000 rpm for 30 minutes followed by ultrasonification of 750 W for 30 minutes. It will be appreciated that suitable rates and time depend on the type and the size of high shear mixer to a large degree. These steps may be performed at room temperature. These steps may be repeated until a homogeneous nanoclay/water mixture is obtained.

In some embodiments, the aqueous blowing agent further comprises a water soluble, polar comonomer containing a carbon-to-carbon double bond dissolved in the water. In these embodiments, the polymeric spheres within the water droplets consist of a copolymer of styrene and the comonomer. The amount of the water soluble, polar comonomer in the aqueous blowing agent may preferably be 0.01-1 wt %, more preferably 0.01-0.1 wt %, with respect to the monomers in the starting composition. In other embodiments, the aqueous blowing agent comprises no or little amount, e.g. less than 0.01 wt % (with respect to the monomers in the starting composition) of such comonomer. In these embodiments, the polymeric spheres within the water droplets consist of polystyrene.

This method is different from aforementioned routes for preparation of styrene copolymers in the sense that the styrene copolymer in the present invention is confined within the droplets and is not distributed in the polystyrene matrix or present as a surface coating of the beads as is the case in U.S. Pat. No. 5,096,931, WO98/01501 or WO2013/029757A1. The present invention also differs from the approach in WO98/01489 (Example 5) which describes a pre-polymer containing AOT as emulsifier and a procedure in which the acrylic acid is polymerized prior to initiation of styrene polymerization. In WO98/01489 (Example 5), the polyacrylic acid is used as a stabilizing agent and the acrylic acid does not form a copolymer with styrene.

The term "polar" as referred to herein is well-known to the skilled person in the art; for instance, a polar molecule is defined in the prior art as a molecule having a permanent electric dipole moment or polarity refers in the prior art to a separation of electric charge leading to a molecule or its chemical groups having an electric dipole or multipole moment, molecular polarity being typically dependent on the difference in electronegativity between atoms in a compound and the asymmetry of the compound's structure; the polar molecules interact through dipole-dipole intermolecular forces and hydrogen bonds (see e.g. http://en.wikipedia.org/wiki/Chemical_polarity and R. T. Morrison and R. N. Boyd, Organic chemistry, 5th edition, Chapter 1). In G. Solomons, Fundamentals of Organic Chemistry, 5th edition, Chapter i, page 38, the term polar bond is also described as when two atoms of different electronegativities form a covalent bond; due to this difference in electronegativity, the electrons are not shared equally between them. The atom with the greater electronegativity draws the electron pair closer to it, and a polar covalent bond results. A polar comonomer as referred to in the present invention can be defined thus as a molecule comprising at least one carbon to carbon double bond together with at least two atoms of different electronegativities forming a covalent bond with each other.

Examples of the polar comonomer containing a carbon-to-carbon double bond may be represented by the comonomer of formula (1),

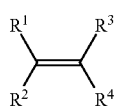

(1)

wherein $R^1$ stands for H or for an alkyl having 1 to 3 C-atoms,
wherein $R^2$ stands for H or for a carboxylic acid
wherein $R^3$ stands for H or for an optionally substituted alkyl having 1 to 6 C-atoms
wherein $R^4$ stands for a polar group selected from the group consisting of a carboxylic acid group (COOH), a carboxylic acid amide group connected via the C-atom (C(O)NH$_2$), a carboxylic acid amide group connected via the N-atom (NHC(O)H), an N-pyrrolidinone group, a pyridine group, a carboxylic acid alkyl ester group having 2 to 4 C-atoms substituted with a polar group $R^7$, wherein $R^7$ stands for a hydroxyl group (OH), an amine group (NH$_2$) or for a carboxylic acid group (COOH) and an ether group having 1 to 3 C-atoms substituted with a polar group $R^8$, wherein $R^8$ stands for a hydroxyl group (OH), a primary, secondary or a tertiary amine group (NR$^5$R$^6$, wherein R$^5$ and R$^6$) or for a carboxylic acid group (COOH) and wherein $R^2$ and $R^4$ may form a ring together with the C-atoms to which they are bound and wherein $R^3$ and $R^4$ may form a ring together with the C-atoms to which they are bound.

$R^1$ preferably stands for H or methyl.
$R^2$ preferably stands for H.
$R^3$ may stand for an optionally substituted alkyl having 1 to 6 C-atoms, preferably for H, methyl, ethyl or i-propyl; Substituents include polar groups, such as for example a carboxylic acid group (COOH), an amine group (NH$_2$), an amide group (C(O)NH$_2$) and a hydroxyl group (OH).

$R^4$ may stand for a carboxylic acid alkyl ester having 2 to 4 C-atoms substituted with a polar group $R^7$, wherein $R^7$ stands for a hydroxyl group (OH), an amine group (NH$_2$), a carboxylic acid group (COOH), for example for a carboxylic acid methyl ester or for a carboxylic acid ethyl ester.

$R^2$ and $R^4$ may form a ring together with the C-atoms to which they are bound; for example a ring containing a heteroatom, for example N or O.

$R^3$ and $R^4$ may form a ring together with the C-atoms to which they are bound, for example a ring containing a heteroatom, for example N or O.

Examples of the polar comonomer of formula (1) include but are not limited to acrylic acid ($R^1$, $R^2$ and $R^3$ stand for H and $R^4$ stands for a carboxylic acid group), methacrylic acid ($R^1$ and $R^2$ stand for H, $R^3$ stands for methyl and $R^4$ stands for a carboxylic acid group), propyl acrylic acid ($R^1$ and $R^2$ stand for H, $R^3$ stands for i-propyl and $R^4$ stands for a carboxylic acid group), maleic acid or citraconic acid ($R^1$ and $R^3$ stand for a carboxylic acid group and $R^2$ and $R^4$ stand for H), itaconic acid ($R^1$ and $R^2$ stand for H, $R^3$ stands for methyl substituted with a carboxylic acid group and $R^4$ stands for a carboxylic acid group), measconic acid ($R^1$ stands for methyl, $R^2$ stands for a carboxylic acid group, $R^3$ stands for H and $R^4$ stands for a carboxylic acid group), acrylamide ($R^1$, $R^2$ and $R^3$ stand for H and $R^4$ stands for an amide group connected via the C-atom), methacrylic amide ($R^1$ and $R^2$ stand for H, $R^3$ stands for methyl and $R^4$ stands for an amide group connected via the C-atom), vinylpyrolidinone ($R^1$, $R^2$ and $R^3$ stand for H and $R^4$ stands for pyrollidinone), N-vinylformamide ($R^1$, $R^2$ and $R^3$ stand for H and $R^4$ stands for an amide group connected via the N atom), vinylpyridine ($R^1$, $R^2$ and $R^3$ stand for H and $R^4$ stands for pyridine), 2-hydroxy ethylacrylate ($R^1$, $R^2$ and $R^3$ stand for H and $R^4$ stands for the ethylester of carboxylic acid substituted with a hydroxyl group), 2-hydroxyethylmethacrylate ($R^1$ and $R^2$ stand for H and $R^3$ stands for methyl and $R^4$ stands for the ethylester of carboxylic acid substituted with a hydroxyl group), 2-hydroxyethylvinylether ($R^1$, $R^2$ and $R^3$ stand for H and $R^4$ stands for an ethylether substituted with a hydroxyl group), 2-aminoethylacrylate ($R^1$, $R^2$ and $R^3$ stand for H and $R^4$ stands for the ethylester of carboxylic acid substituted with an amine group), 2-aminoethylvinylether ($R^1$, $R^2$ and $R^3$ stand for H and $R^4$ stands for ethylether substituted with an amine group), citraconic acid anhydride ($R^1$ stands for methyl, $R^2$ and $R^4$ form a ring together with the carbon atoms to which they are bound and the ring contains an O-atom and $R^3$ stands for H), itaconic acid anhydride and maleic acid anhydride ($R^1$ and $R^3$ stand for H and $R^2$ and $R^4$ form a ring together with the carbon atoms to which they are bound and the ring contains an O-atom).

Further suitable comonomers include dialkylvinyl phosphonates.

Further suitable comonomers include styrene sulfonate, vinyl benzene boronic acid and salts of these monomers. The water soluble polar comonomer residues in the polymer chain are believed to have an advantageous effect on the water incorporation in the polymer beads. Thus WEPS beads with a higher loading of blowing agent is obtained, which is beneficial for expansion properties. Particularly preferred are the polar comonomers selected from (meth)acrylic acid, styrene sulfonate, vinyl benzene boronic acid and salts thereof, especially 2-hydroxyethylmethacrylate.

In particularly preferred embodiments, the aqueous blowing agent comprises water, the water soluble initiator and the water soluble polar comonomer dissolved in the water and a modifier-free nanoclay dispersed in the water.

Step d)

The inverse emulsion obtained by step c) is suspended in an aqueous medium to obtain an aqueous suspension of suspended droplets. The aqueous medium may be added to the inverse emulsion or the inverse emulsion may be added to the aqueous medium while stirring. The aqueous medium may contain a suspension stabilizer. Any conventional suspension stabilizer may be used, such as polyvinylalcohol, gelatine, polyethyleneglycol, hydroxyethylcellulose, carboxymethylcellulose, polyvinylpyrrolidone, polyacrylamide, but also salts of poly(meth)acrylic acid, phosphonic acid or (pyro)phosphoric acid, maleic acid, ethylene diamine tetracetic acid, and the like, as will be appreciated by the person skilled in the art. Suitable salts include the ammonium, alkali metal and alkaline earth metal salts. An advantageous example of such a salt is tricalcium phosphate. Preferably, the stabilizing agent is based on polyvinylalcohol. The amount of the stabilizing agents may suitably vary from 0.05 to 1.2, preferably from 0.15 to 0.8% wt, based on the weight of suspension water. The volume ratio between the aqueous medium and the prepolymer composition may vary between wide ranges, as will be appreciated by a person skilled in the art. Suitable volume ratios include 1:1 to 1:10 (prepolymer composition:aqueous suspension). The optimal ratio is determined by economic considerations.

Preferably, the aqueous medium has a temperature close to the inverse emulsion. This avoids the temperature decrease of the inverse emulsion.

Step e)

The prepolymer composition which is suspended in water containing suspension stabilizer as described in step d) is subjected to suspension polymerization. The styrene (and comonomers, if any) are polymerized. The temperature of this polymerization step varies with reaction time, but is typically between 90-135° C. The temperature is preferably at least as high as the prepolymerization step b). The suspension polymerization is preferably performed for a period of 250-320 min, more preferably 270-280 min. When this step is performed at a higher pressure, the temperature may be higher. For example, at a pressure of 4 bars, the step may be performed at a temperature of up to 125-130° C. The polymerization is preferably performed in this case for a period of up to 410 minutes, preferably for a period of 180-300 minutes, preferably from 200-280 minutes.

Steps a)-e) may be performed in the same reactor. This provides a simple process compared e.g. to the processes in which the prepolymerization step and the polymerization step are performed in different reactors. The reactor may be a glass reactor where one can look inside, or a pressurized reactor made of e.g. a stainless steel.

The expandable polymer beads may be further coated with a coating composition for reducing the tendency of the particles to agglomerate and/or suppressing the diffusion of water out of the beads. Examples of such coating compositions are compositions containing glycerol- or metal carboxylates. Such compounds reduce the tendency of the particles to agglomerate. Suitable carboxylates are glycerol mono-, di- and/or tristearate and zinc stearate. Examples for such additive composition are disclosed in GB-A-1,409,285. Particularly useful coating composition comprises wax, especially paraffin wax. The coating composition are deposited onto the particles via known methods e.g. via dry-coating in a ribbon blender or via a slurry or solution in a readily vaporizing liquid.

The present invention also relates to water expandable polymer beads obtained or obtainable by the present invention.

The water expandable polymer beads according to the present invention preferably have an average diameter of 0.1 to 3 mm, preferably from 0.4 to 1.2 mm.

The expandable particles can be pre-foamed by hot air or by using (superheated) steam, to yield expanded or pre-expanded particles. Such particles have a reduced density, e.g. from 800 to 30 kg/m$^3$. It will be appreciated that in order to vaporize the water included in the particles to effect foaming, the temperature must be higher than used for C3-C6 hydrocarbon foaming agents which have a lower boiling point than water. Foaming can also be effected by heating in oil, hot air or by microwaves.

Therefore, the present invention also relates to expanded polymer beads obtained or obtainable by expanding the water expandable polymer beads according to the present invention.

Further, the present invention relates to an aqueous blowing agent comprising water and a water soluble initiator dissolved in the water for water expandable polymer beads comprising polystyrene.

Further, the present invention relates to the use of an aqueous blowing agent comprising water and a water soluble initiator dissolved in the water for the production of water expandable polymer beads comprising polystyrene.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

The invention is now elucidated by way of the following examples, without however being limited thereto.

EXAMPLES

Materials

The monomers styrene, 4-styrenesulfonic acid sodium salt hydrate and acrylic acid, the initiators potassium persulfate, tert-butylperoxybenzoate and dibenzoyl peroxide (DBPO, 75% purity), and the PGV nanoclay used as water carrier were obtained from Aldrich and used as received.

A dispersion of nanoclay in water (62.5 g/L) was prepared by mixing 40 g of PGV nanoclay in 640 mL demineralized water. Exfoliation of the nanoclay was effected according to the procedure described in WO2013/029757A1.

Example 1: WEPS Containing PS/AA Latex

Preparation of the Blowing Agent Medium:
72.3 g of a dispersion of PGV nanoclay in water (62.5 g/L) was diluted with water (38.5 g) containing potassium persulfate (PPS) (0.20 g, 0.74 mmol). Acrylic acid (AA) (1.20 g, 16.7 mmol) was added and the nanoclay/water/acrylic acid mixture was homogenized.

Preparation of Prepolymer:
In a double-walled glass reactor (2.5 L), polyphenylene ether (PPE) (SABIC Noryl 855A, 100 g) was dissolved in styrene (850 g) at 65° C. A solution of dibenzoylperoxide (3.17 g, 13.1 mmol) and t-butylperoxybenzoate (0.9 g, 4.6 mmol) in styrene (50 g) was added to the PPE solution. The solution temperature was raised to 90° C. while stirring mechanically at 300 rpm. When the torque exerted on the stirrer by the prepolymer reached 2.8 Ncm, the stirring rate was increased to 600 rpm and the blowing agent medium was added in the course of 10 min and an emulsion was obtained. The temperature of the emulsion was allowed to come back to 90° C. while still stirring at 600 rpm.

Suspension Polymerization:
When the torque readout in the prepolymerization reached 7.0 Ncm, the prepolymer was added to a stirred (400 rpm) suspension of tricalciumphosphate ($Ca_3(PO_4)_2$, (14 g, 45 mmol) in water (2.5 kg) in which potassium persulfate (11 mg, 41 μmol) was dissolved in a 6.4 L steel autoclave. The suspension polymerization was performed following the temperature program below:

| t(min) | | 90 | | 60 | | 60 | | 15 | | 15 | |
|---|---|---|---|---|---|---|---|---|---|---|---|
| T(°C.) | 90 | — | 90 | → | 120 | — | 120 | → | 130 | — | 130 |

After cooling to room temperature, the beads were collected by filtration over a polyester sieve cloth (mesh 80 μm) and thoroughly washed with water. Excess water was removed by centrifugation of the beads in the sieve cloth. Further drying of the bead surface was effected by passing a stream of dry nitrogen gas at 30° C. over the beads for 1 hr. The beads were subsequently sieved into 4 cuts (1.7-1.18, 1.18-0.80, 0.80-0.60 and 0.60-0.40 mm) and stored in airtight containers.

Characterization of WEPS Beads:
The water content of the beads was determined by Karl-Fischer titration using a Metrohm 831 KF Coulometer in combination with a Metrohm Thermoprep 832 oven at 160° C.

Molecular weight averages (Mw, Mn) Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4:2003 and ASTM D 6474-99.

Glass transition temperatures ($T_g$) were measured on a Thermal Analysis DSC Q1000. Prior to DSC measurements, the entrapped water was removed from the beads by drying in a vacuum oven for 24 hrs. The temperature was varied between 25 and 140° C. employing heating and cooling rates of 10 cc/min. Only the second run was used for evaluation so as to erase any thermal history.

SEM micrographs were obtained using a JEOL JSM-5600 SEM apparatus. Sliced beads were sputtered with gold.

Expansion of WEPS Beads:
The 1.18-0.80 mm sieve cut was used in expansion experiments. Approximately 0.5-1.0 g of beads were placed in a spherical metal wire basket (Ø 32 mm). The basket was immersed in Dow Corning DC200 silicon oil at 140° C. for 5-10 s. The basket was removed from the oil bath and immediately chilled in a bath of liquid nitrogen. Excess oil was subsequently removed by washing with pentane. This procedure was repeated until 30 mL of foamed material was obtained. The foamed beads were dried in open air and the bulk density $\rho_B$ was determined gravimetrically on 30 mL of foamed beads.

Example 2: WEPS Containing PS/PSSO$_3$Na Latex

Preparation of the Blowing Agent Medium:
72.3 g of a dispersion of PGV nanoclay in water (62.5 g/L) was diluted with water (38.5 g) containing potassium persulfate (0.20 g, 0.74 mmol). Sodium 4-vinylbenzene sulfonate (StySO$_3$Na) (3.4 g, 16.7 mmol) was added and the blowing agent medium was homogenized.

Preparation of prepolymer and subsequent suspension polymerization were carried out according to the procedure given in Example 1. Expansion of the WEPS beads was effected as described for Example 1.

Example 3: WEPS Containing PS Latex (SAB1106)

Preparation of the Blowing Agent Medium:
Potassium persulfate (0.20 g, 0.74 mmol) was added to a dispersion of PGV nanoclay in water (90 g, 62.5 g/L) and the mixture was homogenized.

Preparation of prepolymer and subsequent suspension polymerization were carried out according to the procedure given in Example 1.

Example 4: WEPS Containing PS/AA Latex without Nanoclay

Preparation of the Blowing Agent Medium:
Potassium persulfate (0.20 g, 0.74 mmol) was dissolved in water (90 g). Acrylic acid (1.80 g, 25.0 mmol) was added and the mixture was homogenized.

Preparation of prepolymer and subsequent suspension polymerization were carried out according to the procedure given in Example 1.

Example 5: WEPS Containing PS/AA Latex without PPE, but with Nanoclay

Preparation of the Blowing Agent Medium:
Acrylic acid (1.17 g, 16.2 mmol) was added to 90 g of a dispersion of PGV nanoclay in water (62.5 g/L). Potassium persulfate (0.22 g, 0.74 mmol) was added and the mixture was homogenized.

Preparation of Prepolymer:
In a double-walled glass reactor (2.5 L), a solution of dibenzoylperoxide (5.3 g, 21.9 mmol) and t-butylperoxybenzoate (1.0 g, 5.2 mmol) in styrene (1000 g) was heated at 90° C. while stirring mechanically at 300 rpm. When the torque exerted on the stirrer by the prepolymer reached 2.7 Ncm, the stirring rate was increased to 600 rpm and the blowing agent medium was added in the course of 10 min and an emulsion was obtained. The temperature of the emulsion was allowed to come back to 90° C. while still stirring at 600 rpm.

The suspension polymerization was carried out according to the procedure given in Example 1.

Example 6: WEPS Containing PS/AA Latex without PPE and without Nanoclay

Preparation of the Blowing Agent Medium:
Acrylic acid (2.0 g, 27.8 mmol) was dissolved in water (90 g), containing potassium persulfate (0.22 g, 0.81 mmol).
Preparation of prepolymer and subsequent suspension polymerization were carried out according to the procedure given in Example 1. Expansion of the WEPS beads was effected as described for Example 1.
Preparation of the Blowing Agent Medium:
The blowing agent medium consisted of a dispersion of PGV nanoclay in water (111 g, 62.5 g/L).
Preparation of prepolymer and subsequent suspension polymerization were carried out according to the procedure given in Example 1.
Polymer properties of the WEPS beads are collected in Table 1.

TABLE 1

Selected polymer properties for WEPS beads.

| Example | PPE | clay | PPS | Polar Monomer | Mw kg/mol | PDI | $T_g$ ° C. |
|---|---|---|---|---|---|---|---|
| Ex 1 | + | + | + | AA | 250 | 5.3 | 106 |
| Ex 2 | + | + | + | StySO$_3$Na | 273 | 3.9 | 113 |
| Ex 3 | + | + | + | — | 190 | 4.2 | 112 |
| Ex 4 | + | − | + | AA | 162 | 3.9 | 109 |
| Ex 5 | − | + | + | AA | 145 | 2.8 | 97 |
| Ex 6 | − | + | + | AA | 193 | 4.1 | 97 |
| Comp. Ex A | + | + | − | — | 214 | 4.5 | 111 |

Expansion properties of WEPS beads are collected in Table 2.

TABLE 2

Water content of unfoamed WEPS beads and bulk densities of expanded WEPS beads.

| Example | PPE | clay | PPS | Polar Mon | $d_{max}$ μm | [H$_2$O] wt % | $\rho_B$ kg/m$^3$ |
|---|---|---|---|---|---|---|---|
| Ex 1 | + | + | + | AA | 20 | 10.1 | 54 |
| Ex 2 | + | + | + | StySO$_3$Na | 30 | 12.6 | 57 |
| Ex 3 | + | + | + | — | 45 | 8.2 | 77 |
| Ex 4 | + | − | + | AA | 20 | 4.1 | 81 |
| Ex 5 | − | + | + | AA | 45 | 8.8 | 102 |
| Ex 6 | − | − | + | AA | 50 | 5.3 | 95 |
| Comp. Ex A | + | + | − | — | 75 | 10.8 | 212 |

Comparison of the results according to comparative experiment A and the results according to example 3 shows the effect of the PPS in the blowing agent. By application of the preparation process according to the invention according to example 3 (use of PPS as initiator), the diameter of the water droplets in the WEPS beads is lower compared to the process in which no initiator was used in the blowing agent. This leads to better expandable WEPS beads; the bulk density of the expanded beads is lowered from 212 kg/m$^3$ to 77 kg/m$^3$.

Further, the effects of the presence of PPE in the starting composition and the presence of nanoclay and polar comonomer in the blowing agent can be seen by comparison of examples 1 and 4-6.

In example 6, the blowing agent comprises a polar comonomer acrylic acid. By the addition of the PPE according to example 4 in comparison with example 6, the diameter of the water droplets in the WEPS beads is lowered considerably. By the addition of the nanoclay according to example 5 in comparison with example 6, the amount of water in the non-expanded WEPS is increased. When both nanoclay and PPE are added according to example 1, the diameter of the water droplets in the WEPS beads is further reduced and the amount of water in the non-expanded WEPS beads is further increased. This together leads to better expandable WEPS beads, with a low bulk density of 54 kg/m$^3$. Ex 2 shows that similar effects can be obtained by the use of a different comonomer.

Morphology of WEPS Beads Before and after Foaming
The morphology of unexpanded and expanded WEPS beads was studied by scanning electron microscopy (SEM).
FIG. 1a shows a SEM micrograph of a WEPS bead prepared according to example 1 of the present invention (PS/AA-latex). The cross-section shows a distribution of holes with diameter d<20 μm. FIG. 1b shows a close-up of one of the holes completely filled with PS latex particles with a diameter d'<400 nm.
FIG. 2 shows a SEM micrograph of a WEPS bead, prepared according to Example 1 and subjected to the foaming procedure as described above.
FIG. 3a shows a SEM micrograph of a WEPS bead prepared according to Example 2 of the present invention (PS/PSSO$_3$Na AA-latex). The cross-section shows a distribution of holes with diameter d<30 μm. FIG. 3b shows a close-up of one of the holes filled with latex particles.
FIG. 4 shows a SEM micrograph of a WEPS bead, prepared according to Example 2 and subjected to the foaming procedure as described above.
FIG. 5a shows a SEM mictograph of a WEPS bead prepared according to Example 3 of the present invention (PS-latex). The cross-section shows a distribution of holes with diameter d<45 μm. FIG. 5b shows a close-up of one of the holes filled with PS latex particles.
FIG. 6 shows a SEM micrograph of a WEPS bead, prepared according to Example 3 and subjected to the foaming procedure as described above.
FIG. 7a shows a SEM mictograph of a WEPS bead prepared according to Example 4 of the present invention (PS/AA-latex, no nanoclay). The cross-section shows a distribution of holes with diameter d<20 μm. FIG. 7b shows a close-up of one of the holes filled with latex particles.
FIG. 8 shows a SEM micrograph of a WEPS bead, prepared according to Example 4 and subjected to the foaming procedure as described above.
FIG. 9a shows a SEM mictograph of a WEPS bead prepared according to Example 5 of the present invention (PS/AA-latex, no PPE). The cross-section shows a distribution of holes with diameter d<45 μm. FIG. 9b shows a close-up of three of the larger holes filled with latex particles.
FIG. 10 shows a SEM micrograph of a WEPS bead prepared according to Example 5 and subjected to the foaming procedure as described above.
FIG. 11a shows a SEM mictograph of a WEPS bead prepared according to Example 6 of the present invention (PS/AA-latex, no nanoclay, no PPE). The cross-section shows a distribution of holes with diameter d<50 μm. FIG. 11b shows a close-up of one of the holes partially filled with latex particles.

FIG. 12 shows a SEM micrograph of a WEPS bead, prepared according to Example 6 and subjected to the foaming procedure as described above.

FIG. 13a shows a SEM mictograph of a WEPS bead prepared according to Comparative Example A of the present invention (PS/PPE, no latex). The cross-section shows a distribution of holes with diameter d<75 μm. FIG. 13b shows a close-up of one of the holes demonstrating the absence of latex.

FIG. 14 shows a SEM micrograph of a WEPS bead, prepared according to Comparative Example A and subjected to the foaming procedure as described above.

Cross-sections of unfoamed WEPS beads are shown in FIGS. 1, 3, 5, 7, 9, 11 and 13. In all cases, holes can be observed on the surface of the cross-section. These holes result from water droplets entrapped in the polymer matrix which leave holes upon evaporation of the water during cross-sectioning. For good expansion it is beneficial to have many droplets with small diameters (d), evenly distributed throughout the bead. In the case of latex-recipes, the holes are partially or completely filled with latex particles.

The invention claimed is:

1. An emulsifier-free process for the preparation of water expandable polymer beads, which process comprises the steps of:
   a) providing an emulsifier-free starting composition comprising styrene,
   b) prepolymerizing the starting composition to obtain a prepolymer composition,
   c) mixing an aqueous blowing agent with the prepolymer composition at an elevated temperature to obtain an inverse emulsion of water droplets in the prepolymer composition, wherein the aqueous blowing agent comprises water and a water soluble initiator dissolved in the water and the water droplets comprise spheres of a styrene polymer, wherein the water soluble initiator partly decomposes due to the elevated temperature leading to the formation of the inverse emulsion of water droplets in the prepolymer composition,
   d) suspending the inverse emulsion in an aqueous medium to yield an aqueous suspension of suspended droplets and
   e) polymerizing monomers in the droplets of the suspension obtained by step d) to obtain the water expandable polymer beads.

2. The process of claim 1, wherein the water soluble initiator is a persulfate.

3. The process of claim 2, wherein the water soluble initiator is selected from the group consisting of sodium $Na_2SO_5$, $KHSO_5$, $K_2S_2O_8$, $Na_2S_2O_8$ and $(NH_4)_2S_2O_8$.

4. The process of claim 1, wherein the aqueous blowing agent further comprises a modifier-free nanoclay dispersed in the water.

5. The process according to claim 4, wherein the modifier-free nanoclay is an unmodified sodium montmorillonite nanoclay.

6. The process according to claim 4, wherein the amount of the nanoclay is 0.1-10 wt % of the total weight of the monomers in the starting composition.

7. The process of claim 1, wherein the aqueous blowing agent further comprises a water soluble polar comonomer containing a carbon-to-carbon double bond.

8. The process of claim 7, wherein the water soluble polar comonomer is selected from the group consisting of (meth) acrylic acid, styrene sulfonate, vinyl benzene boronic acid and salts thereof.

9. The process claim 1, wherein the starting composition further comprises a polyphenylene ether resin.

10. The process according to claim 1, wherein step b) comprises heating the starting composition at a temperature of 85-91° C. for a period of 30-120 minutes.

11. The process according to claim 1, wherein step c) comprises stirring the mixture at a temperature of 85-95° C.

12. The process according to claim 1, wherein step e) comprises heating the suspension obtained by step d) at a temperature of 90-135° C. for a period of 180-300 minutes.

13. Water expandable polymer beads obtained by the process according to claim 1.

14. Expanded polymer beads obtained by expanding the water expandable polymer beads according to claim 13.

15. The process according to claim 4, wherein:
   the amount of the nanoclay is 0.1-5 wt % of the total weight of the monomers in the starting composition,
   step b) comprises heating the starting composition for a period of 70-90 minutes, and
   step e) comprises heating the suspension obtained by step d) for a period of from 200-280 minutes.

16. The process according to claim 1, wherein:
   the water soluble initiator is a persulfate, and
   the aqueous blowing agent further comprises a modifier-free nanoclay dispersed in the water, and a water soluble polar comonomer containing a carbon-to-carbon double bond.

17. The process according to claim 1, wherein:
   the starting composition further comprises a polyphenylene ether resin,
   the nanoclay is an unmodified sodium montmorillonite nanoclay,
   the amount of the nanoclay is 0.1-10 wt % of of the total weight of the monomers in the starting composition.

18. The process according to claim 17, wherein
   the water soluble initiator is selected from the group consisting of sodium $Na_2SO_5$, $KHSO_5$, $K_2S_2O_8$, $Na_2S_2O_8$ and $(NH_4)_2S_2O_8$, and
   the water soluble polar comonomer is selected from the group consisting of (meth)acrylic acid, styrene sulfonate, vinyl benzene boronic acid and salts thereof.

19. Water expandable polymer beads obtained by the process according to claim 16.

20. Expanded polymer beads obtained by expanding the water expandable polymer beads according to claim 19.

* * * * *